United States Patent
Uh et al.

(10) Patent No.: US 8,153,289 B2
(45) Date of Patent: Apr. 10, 2012

(54) SECONDARY BATTERY

(75) Inventors: Hwail Uh, Yongin-si (KR); Sangwoo Lee, Yongin-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 706 days.

(21) Appl. No.: 12/230,250

(22) Filed: Aug. 26, 2008

(65) Prior Publication Data

US 2009/0075159 A1    Mar. 19, 2009

(30) Foreign Application Priority Data

Sep. 14, 2007   (KR) .................. 10-2007-0093700

(51) Int. Cl.
*H01M 2/12* (2006.01)
(52) U.S. Cl. ............... 429/56; 429/53; 429/57; 429/61; 429/64; 429/82; 429/83
(58) Field of Classification Search ............ 429/53, 429/56, 57, 61, 64, 82, 83
See application file for complete search history.

(56) References Cited

U.S. PATENT DOCUMENTS

| | | | |
|---|---|---|---|
| 4,803,136 A | 2/1989 | Bowsky et al. | |
| 6,569,562 B1 * | 5/2003 | Spillman et al. | 429/163 |
| 6,805,992 B1 * | 10/2004 | Hanafusa et al. | 429/56 |
| 2003/0077505 A1 * | 4/2003 | Goda et al. | 429/56 |
| 2005/0106451 A1 | 5/2005 | Kim et al. | |
| 2005/0181272 A1 | 8/2005 | Kim | |
| 2007/0099070 A1 | 5/2007 | Aizawa et al. | |
| 2007/0202393 A1 | 8/2007 | Hu et al. | |

FOREIGN PATENT DOCUMENTS

| | | |
|---|---|---|
| EP | 1168468 A1 | 1/2002 |
| EP | 1258931 A1 | 11/2002 |
| JP | 07-169452 | 7/1995 |
| JP | 11-297292 | 10/1999 |
| JP | 2000-149901 | 5/2000 |
| JP | 2004-079330 * | 3/2004 |
| KR | 1020030091717 A | 12/2003 |
| KR | 1020040006077 A | 1/2004 |
| KR | 10-2004-0022922 | 3/2004 |
| KR | 10-2005-0037689 | 4/2005 |
| KR | 10-2006-0027674 | 3/2006 |
| KR | 10-0945067 | 2/2010 |

* cited by examiner

*Primary Examiner* — Patrick Ryan
*Assistant Examiner* — Ben Lewis
(74) *Attorney, Agent, or Firm* — Robert E. Bushnell, Esq.

(57) ABSTRACT

A secondary battery has a safety vent formed on a can accommodating an electrode assembly. The safety vent is formed in a groove shape and the depth of the groove varies. The fracture site of the safety vent is controlled by adjusting the depth of the safety vent. The safety vent is prevented from damaging the electrode assembly when the electrode assembly is inserted in the can, and contacts the safety vent.

11 Claims, 13 Drawing Sheets

SECONDARY BATTERY

CLAIM FOR PRIORITY

This application makes reference to, incorporates the same herein, and claims all benefits accruing under 35 U.S.C. §119 from an application earlier filed in the Korean Intellectual Property Office on Sep. 14, 2007 and there duly assigned Serial No. 10-2007-0093700.

BACKGROUND OF THE INVENTION

1. Field of the Invention

The present invention relates to a secondary battery, and more particularly, the present invention relates to a secondary battery including a safety vent having an adjustable fracture site thereof.

2. Description of the Related Art

Compact and light-weight portable electrical/electronic devices, such as cellular phones, notebook computers, camcorders and the like, are being actively developed and produced. Therefore, portable electrical/electronic devices have built-in battery packs so that the devices can operate even at locations where external power sources are unavailable. Recently, upon consideration of economical aspects, these battery packs employ secondary batteries that are capable of charging/discharging. Furthermore, secondary batteries are drawing attention in view of their use as batteries for hybrid automobiles, which require high energy density and high power output, and product development thereof is proceeding.

Representative examples of the secondary batteries include nickel-cadmium (Ni—Cd) batteries, nickel-hydrogen (Ni—MH) batteries, lithium (Li) batteries, lithium ion (Li-ion) batteries, and the like.

In particular, lithium ion batteries have an operating voltage approximately 3 times that of nickel-cadmium batteries or nickel-hydrogen batteries which are widely used in power supplies for portable electronic devices. Furthermore, lithium ion batteries are widely used from the viewpoint that the energy density per unit weight is high. Lithium ion batteries use a lithium-based oxide as a positive electrode active material, and use a carbon material as a negative electrode active material. In general, the batteries are classified, in accordance with the type of electrolyte, into liquid electrolyte batteries and polymeric electrolyte batteries. The batteries using liquid electrolyte are referred to as lithium ion batteries, while the batteries using polymeric electrolytes are referred to as lithium polymer batteries. The lithium ion batteries or lithium polymer batteries are put to use while accommodating the electrolyte in a metal case, a pouch type case, or the like, and the shape of the case may be exemplified by a cylindrical type, a square type, a pouch type or the like.

Secondary batteries, including lithium ion batteries and lithium polymer batteries, are sealed and have safety vents installed therein, which enable a portion of the case accommodating a secondary battery to be opened to release gas when the secondary battery is overheated due to overcharging, over-discharging, an internal short circuit and the like and is configured to release excess gas, so that an explosion of the secondary battery is prevented.

However, the structure of such safety vent makes it difficult to predict the shape of fracture thereof because the site of fracture thereof is not consistent when the safety vent is opened to prevent an explosion of the secondary battery. Thus, it is very difficult to design the structure of auxiliary joint structures, such as plastic covers and the joint positions.

Furthermore, there is also a problem in that the electrode assembly can be torn off, contacting the safety vent when an electrode assembly accommodated inside the case is inserted in a can.

SUMMARY OF THE INVENTION

Accordingly, the present invention has been made to solve the above-mentioned problems, and an aspect of the present invention is to provide a secondary battery including a safety vent having an adjustable fracture site thereof.

Furthermore, another aspect of the invention is to provide a secondary battery including a safety vent, having an effect of preventing the safety vent from damaging an electrode assembly when the electrode assembly is inserted in a can, contacting the safety vent.

According to one embodiment of the present invention, a secondary battery is includes a safety vent arranged on a can accommodating an electrode assembly, in which the safety vent has a groove shape and the depth of the groove varies.

The depth of the safety vent may gradually increase along a direction of insertion of the electrode assembly into the can.

Moreover, the width of the safety vent may vary along the length direction thereof.

The groove depth of the safety vent may vary with a constant gradient.

According to another embodiment of the present invention, the safety vent may be formed by straight lines intersecting each other to form angles, by straight lines and curves intersecting each other to form flexures, or by curves intersecting each other to form flexures.

According to another embodiment of the present invention, the safety vent may include a first line which is formed in the same direction as the direction of insertion of the electrode assembly into the can; a second line which is formed in a direction perpendicular to the first line to be separated therefrom; and a third line which is formed in a direction oblique to the first line and the second line to link the first line and the second line.

According to another embodiment of the present invention, the depth of the first line may gradually increase to the point of intersection with the third line; the depth of the third line may be constant; and the depth of the second line may gradually decrease from the point of intersection with the third line. Furthermore, the depth of first line may gradually increase to the point of intersection with the third line; the depth of the third line may gradually decrease from the point of intersection with the first line to the mid-point of the third line, and then may gradually decrease from the mid-point of the third line to the point of intersection with the second line; and the depth of the second line may gradually decrease from the point of intersection with the third line. In addition, the depth of the safety vent may gradually increase from the first line to the third line, and then may gradually decrease from the second line.

According to another embodiment of the present invention, the safety vent may include a first line which is formed in the same direction as the direction of insertion of the electrode assembly into the can, and a second line which is formed in a direction perpendicular to the first line to be connected thereto.

According to another embodiment of the present invention, the first line and the second line may be connected to each other in the vicinity of a corner of the can, facing the corner thereof.

According to another embodiment of the present invention, the depth of the first line may gradually increase to the point of intersection with the second line, and the depth of the second line may gradually decrease from the point of intersection with the first line.

Therefore, the secondary battery according to embodiments of the present invention has an effect of controlling the fracture site of the safety vent by adjusting the depth thereof.

Furthermore, the secondary battery according to embodiments of the present invention has an effect of preventing the safety vent from damaging the electrode assembly when the electrode assembly is inserted in the can, contacting the safety vent.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings in which like reference symbols indicate the same or similar components, wherein.

DETAILED DESCRIPTION OF THE INVENTION

Figure 1A:
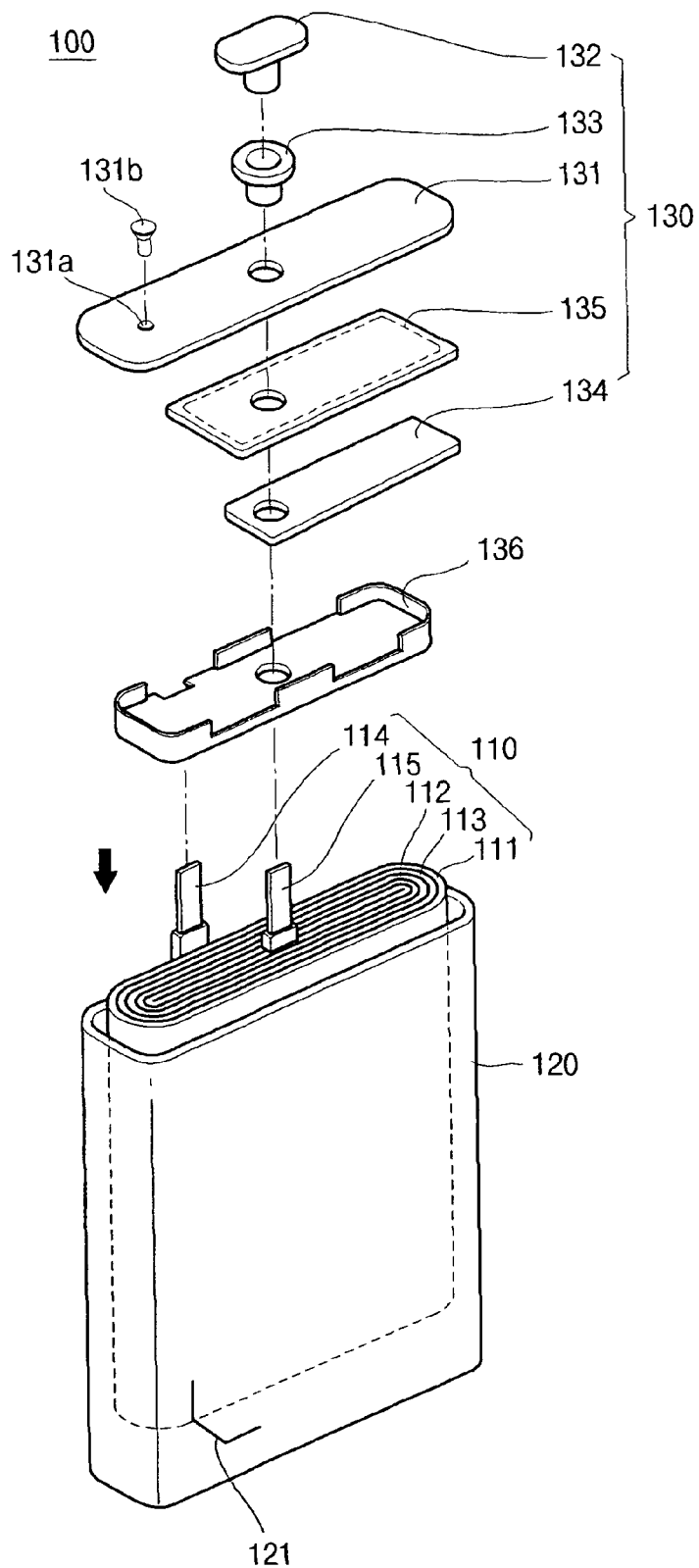
FIG. 1A is an exploded perspective view of a secondary battery according to an embodiment of the present invention.

Hereinafter, exemplary embodiments of the present invention are described in detail with reference to the accompanying drawings, wherein like reference numerals refer to like elements, and repeated descriptions have been omitted.

Figure 1B:
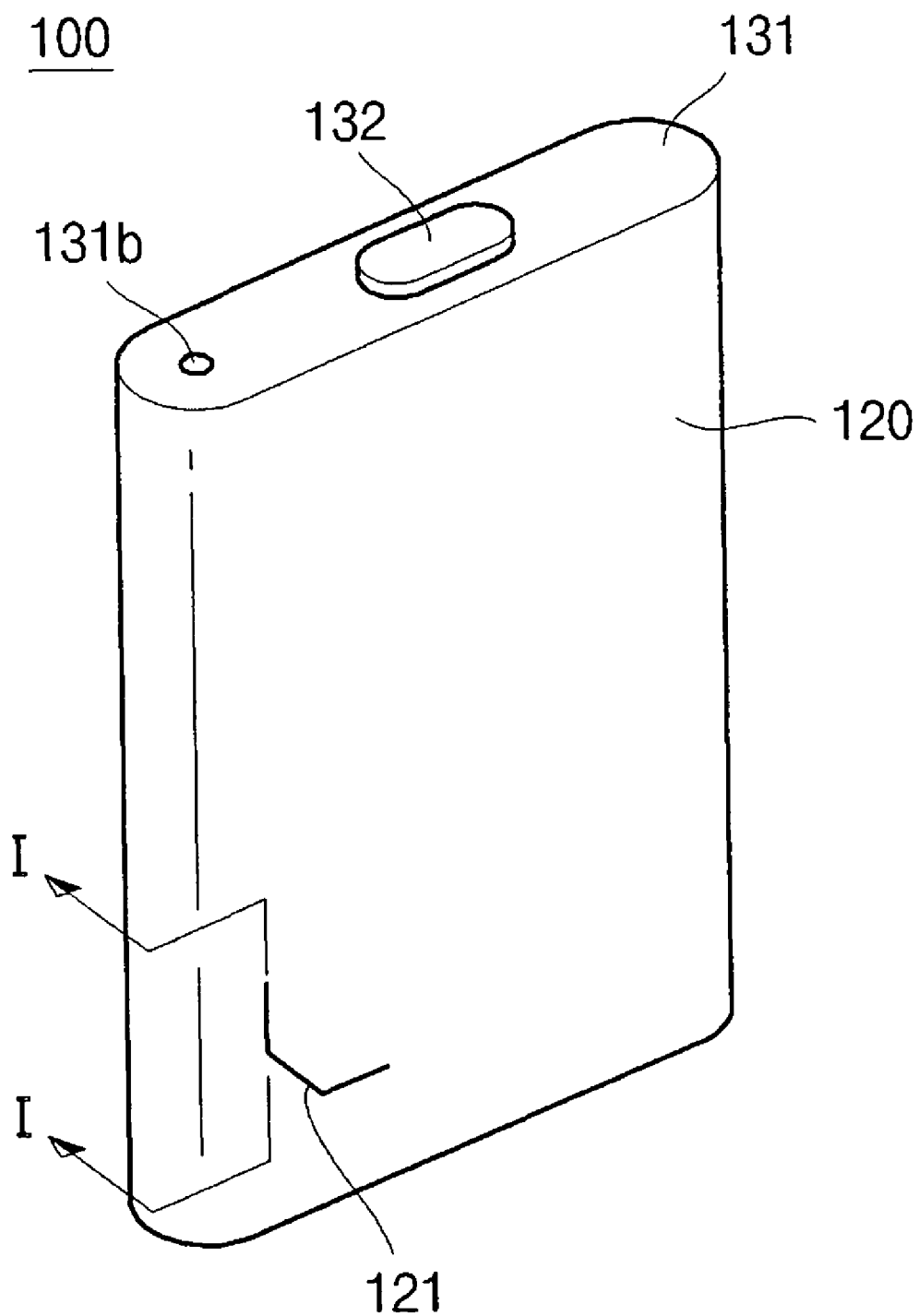
FIG. 1B is a perspective view of the assembled secondary battery of FIG. 1A.
Figure 1C:
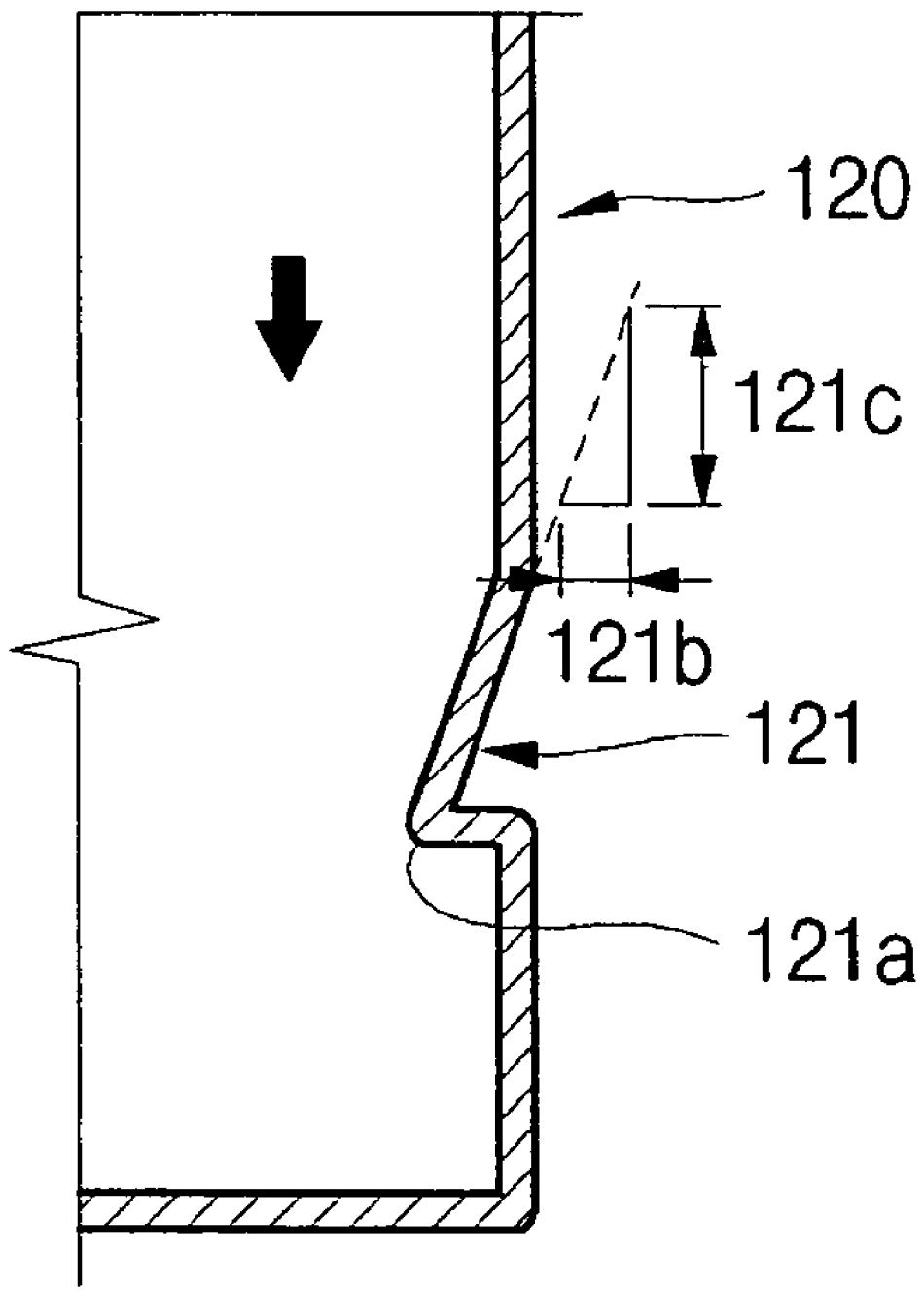
FIG. 1C is a partial cross-sectional view of the secondary battery taken along line I-I of FIG. 1B.
Figure 1D:
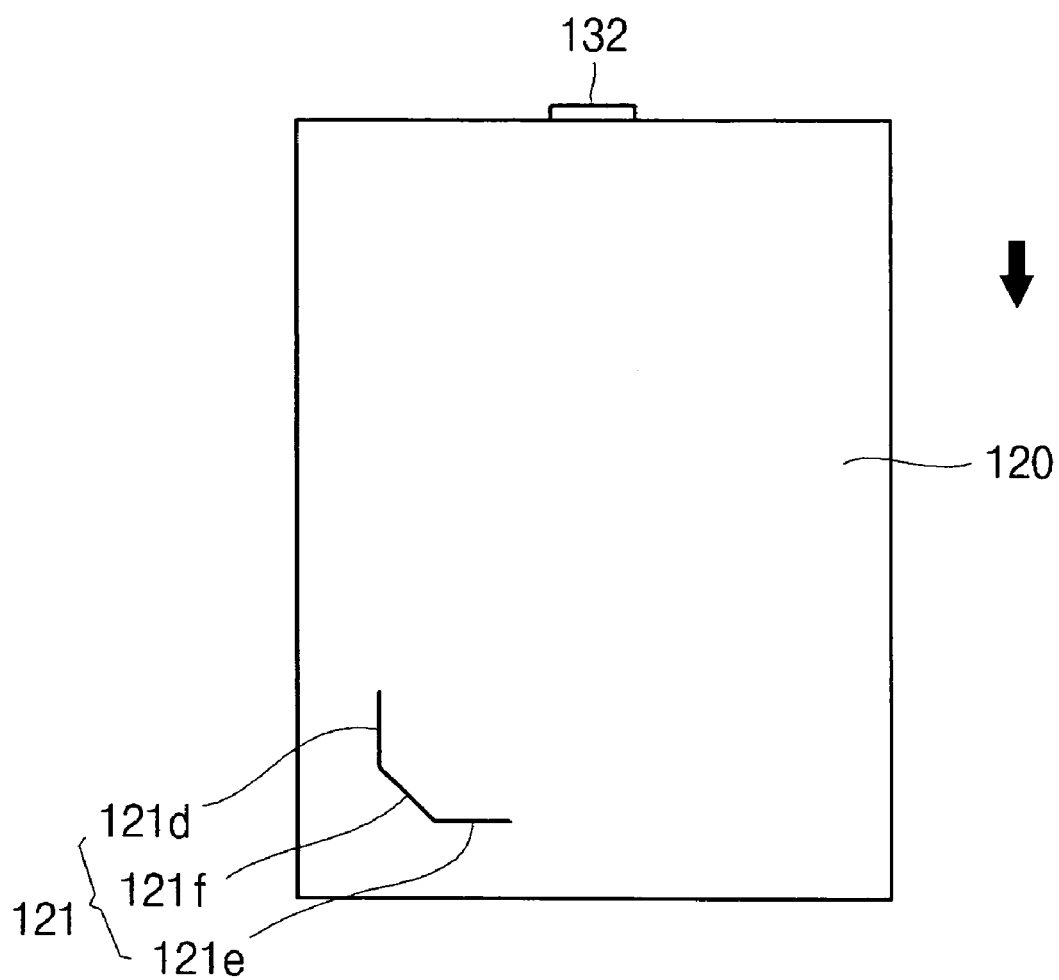
FIG. 1D is a front view of the secondary battery of FIG. 1B.
Figure 1E:
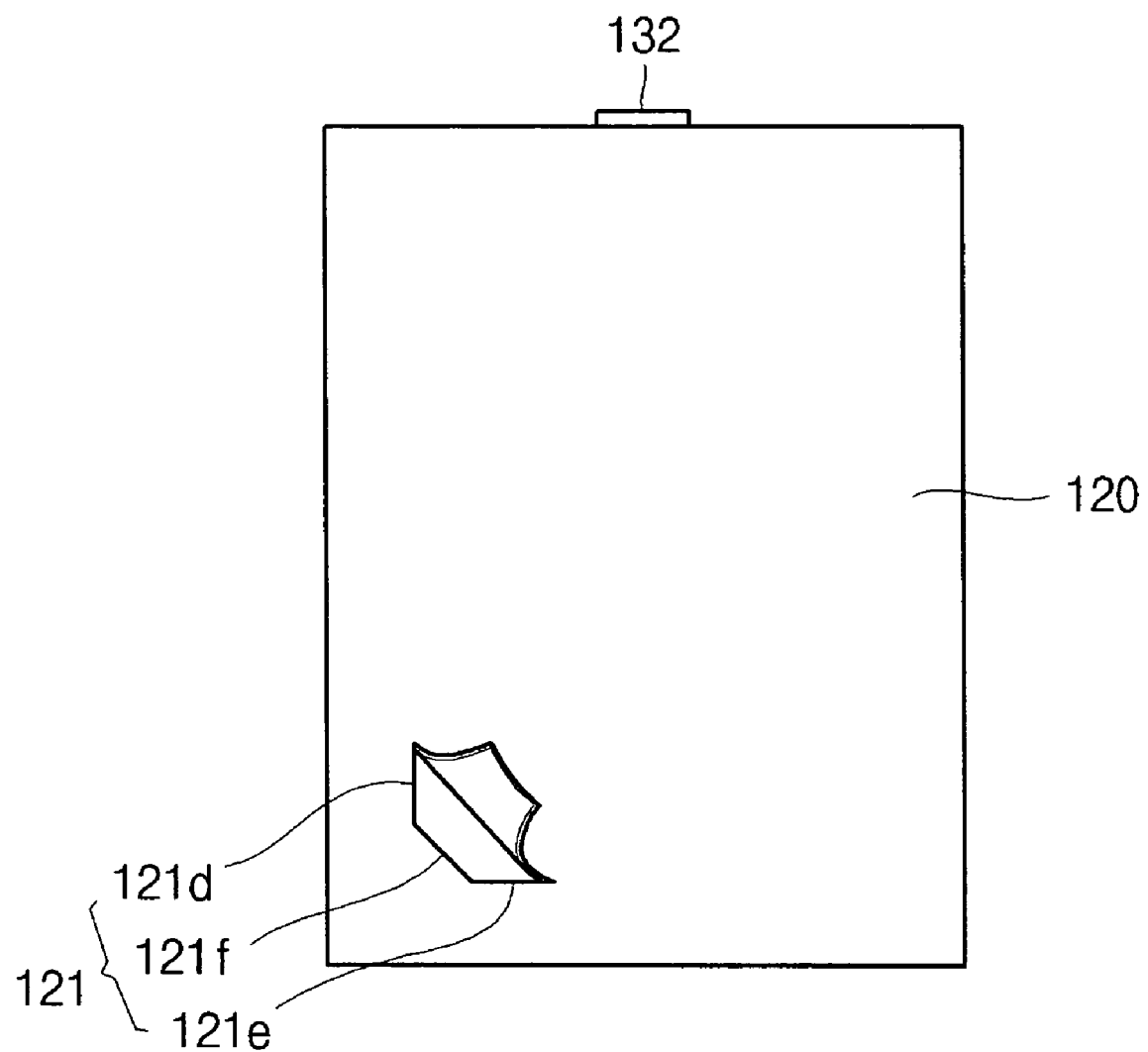
FIG. 1E is a front view of the secondary battery of FIG. 1D, after a safety vent has fractured.
Figure 1F:
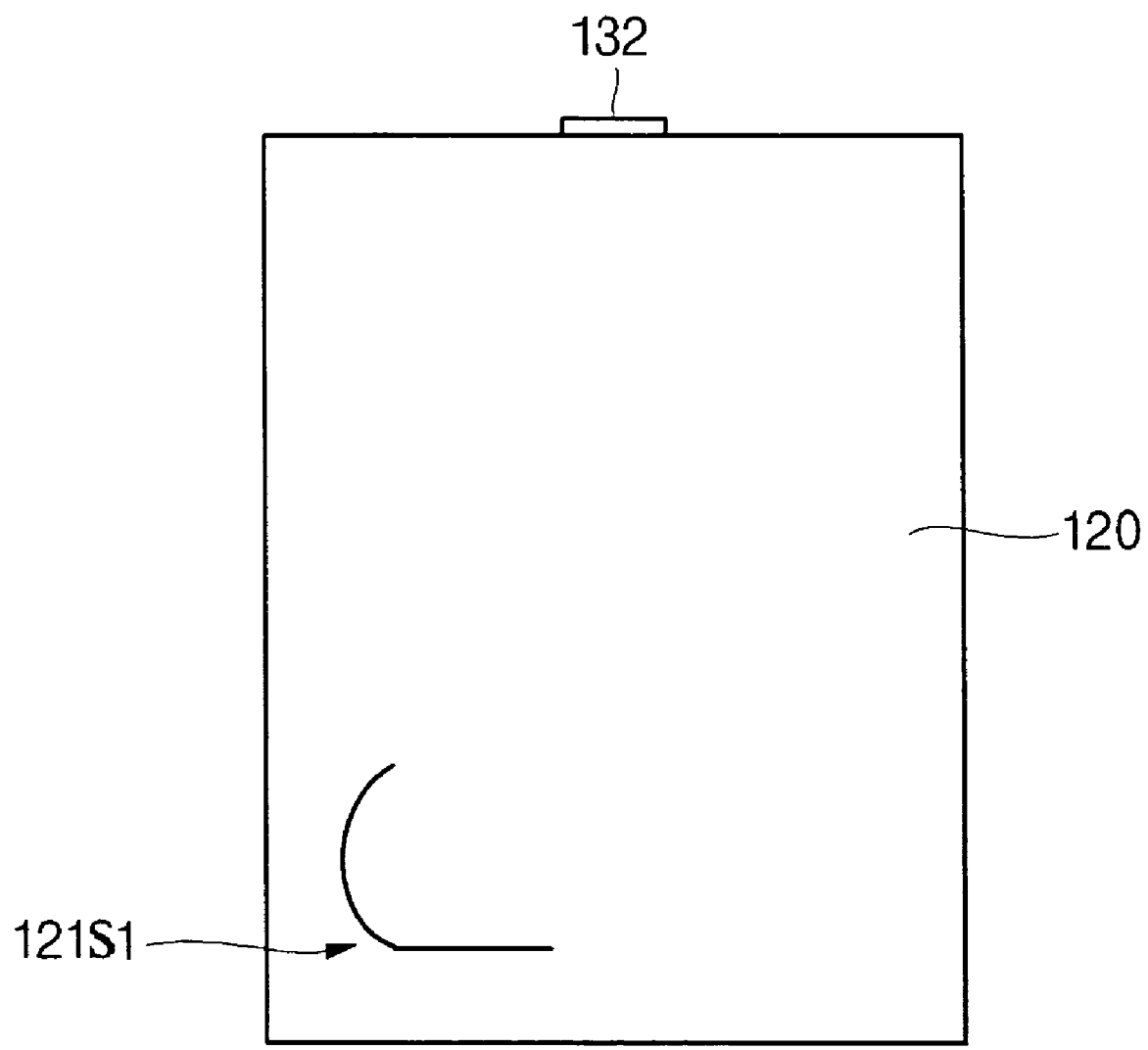
FIG. 1F is one modification example of the secondary battery of FIG. 1D.
Figure 1G:
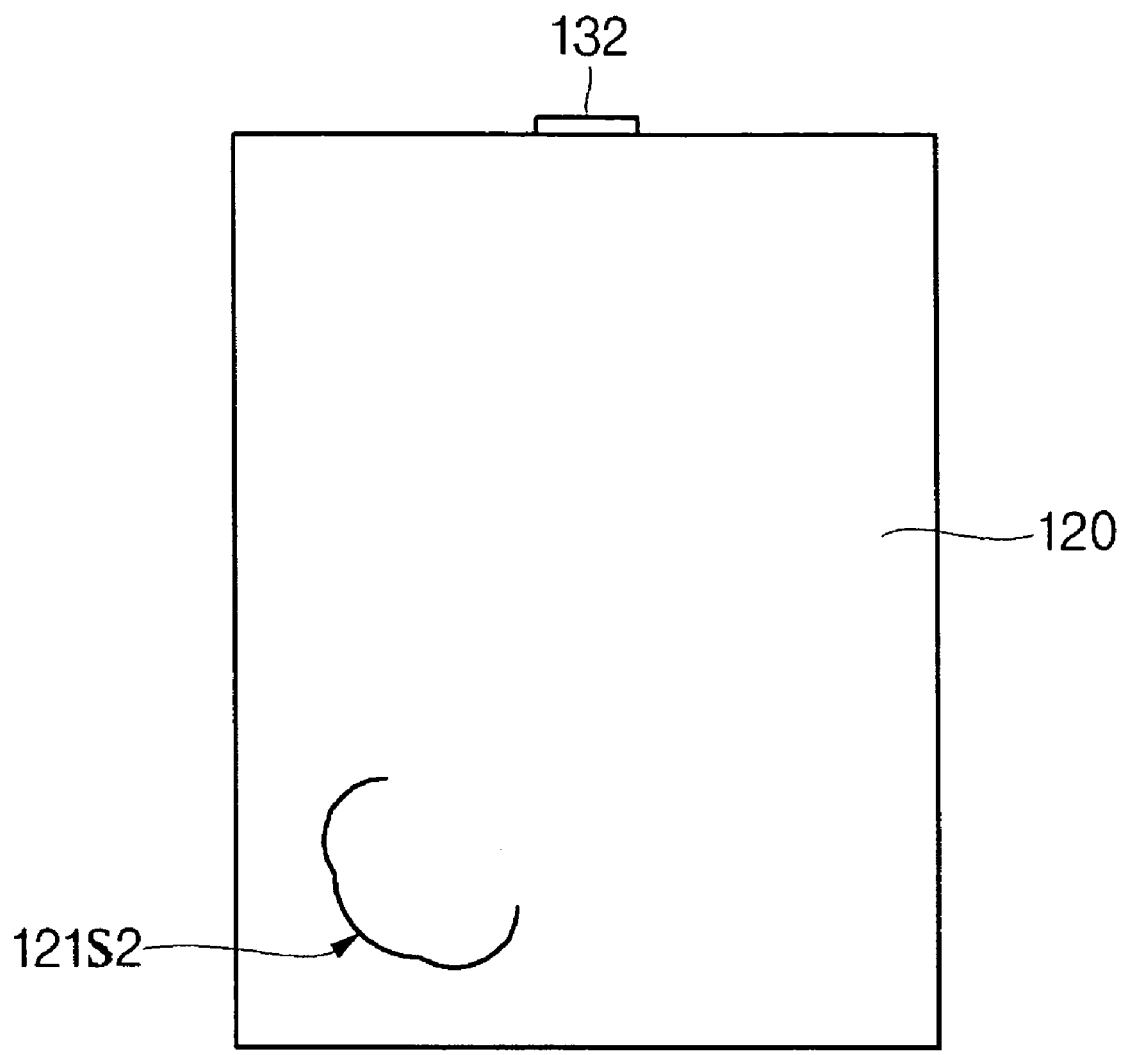
FIG. 1G is another modification example of the secondary battery of FIG. 1D.

FIG. 1A is an exploded perspective view of a secondary battery according to an embodiment of the present invention. FIG. 1B is a perspective view of the assembled secondary battery of FIG. 1A. FIG. 1C is a partial cross-sectional view of the secondary battery taken along line I-I of FIG. 1B. FIG. 1D is a front view of the secondary battery of FIG. 1B. FIG. 1E is a front view of the secondary battery of FIG. 1D, after a safety vent has fractured. FIG. 1F is one modification example of the secondary battery of FIG. 1D. FIG. 1G is another modification example of the secondary battery of FIG. 1D.

As shown in FIGS. 1A and 1B, the secondary battery 100 according to the present invention includes an electrode assembly 110, a can 120, and a cap assembly 130.

First, the electrode assembly 110 may be formed by laminating a positive electrode plate 111 which is connected to a positive electrode tap 114, a negative electrode plate 112 which is connected to a negative electrode tap 115, and a separator 113, and then winding the laminate.

The positive electrode plate 111 includes a positive electrode collector and a positive electrode coating portion. The positive electrode coating portion may include a layer-forming compound containing lithium, a binder for enhancing the binding force, and a conductive material for enhancing the conductivity. The positive electrode collector is generally made of aluminum, and serves as a transfer channel for the charges generated at the positive electrode coating portion and supporting the positive electrode coating portion. There is a positive electrode non-coating portion (not shown) formed on one end of the positive electrode plate 111, having no positive electrode coating portion formed thereon, and attached to the positive electrode tap 114.

The negative electrode plate 112 includes a negative electrode collector and a negative electrode coating portion. The negative electrode coating portion contains carbon, and may include hard carbon, which is largely used in general, or graphite, and a binder for enhancing the binding force between the active material particles. The negative electrode collector is generally made of copper, and serves as a transfer channel for the charges generated at the negative electrode coating portion and supporting the negative electrode coating portion. There is a negative electrode non-coating portion (not shown) formed on one end of the negative electrode plate 112, having no negative electrode coating portion formed thereon, and attached to the negative electrode tap 115.

The separator 113 is interposed between the positive electrode plate 111 and the negative electrode plate 112 to insulate the positive electrode plate 111 and the negative electrode plate 112, and to allow the charges from the positive electrode plate 111 and the negative electrode plate 112 to pass through. In general, the separator 113 is made of polyethylene (PE) or polypropylene (PP). However, the present invention is not limited to these materials.

The can 120 has an open portion, and thus can accommodate the electrode assembly 110. The can 120 contains an electrolyte. The can 120 also has a safety vent 121 arranged on one of its larger surfaces, and the safety vent 121 is opened when the internal pressure increases to a critical pressure value in the sealed can 120 accommodating the electrode assembly 110. This safety vent 121 can be formed in a linear groove shape, so as to discharge the internal gas more easily upon opening. Furthermore, the can 120 may be formed into an angled shape or a round shape, while taking the configuration of the electrode assembly 110 into consideration. The can 120 has an insulating case 136 on top of the electrode assembly 110, and a cap plate 131 arranged on the open portion of the can 120. The cap plate 131 and the can 120 are then attached together by welding or the like. The can 120 is generally made of aluminum. However, the present invention is not limited to this material.

The cap assembly 130 includes a cap plate 131 which has an electrolyte injection hole 131a and an electrolyte injection hole cover 131b formed thereon to seal the electrolyte injection hole 131a, is electrically connected to the positive electrode tap 114, and seals the open portion of the can 120; an electrode terminal 132 which is arranged on a central hole of the cap plate 131, and is electrically connected to the negative electrode tap 115; an insulating gasket 133 which wraps the electrode terminal 132 to insulate the electrode terminal 132 and the cap plate 131; an insulating case 136 which has holes for the positive electrode tap 114 and the negative electrode tap 115 to protrude through, and is arranged on top of the electrode assembly 110 to insulate the upper surface of the electrode assembly 110; a terminal plate 134 which provides a hole for the portion of the electrode terminal 132 to be pressed and fixed; and an insulating plate 135 which insulates the terminal plate 134 and the cap plate 131. The insulating gasket 133, insulating case 136 and insulating plate 135 may be formed of an insulating material, such as polypropylene resin, polyethylene resin or the like, while the electrode terminal 132, cap plate 131 and terminal plate 134 may be formed of a conductive metallic material, such as conductive aluminum, an alloy containing aluminum, nickel, an alloy containing nickel, or the like. However, the present invention is not limited to these materials for the cap assembly 130.

Referring to FIG. 1C to further explain the safety vent 121, the depth of the safety vent 121 formed in a linear groove shape may vary, and such a variance in the depth can be formed at once by pressing with a punch according to a pressing method, or by moving a metal pin along the shape of the safety vent 121. However, the method of forming a safety vent 121 in the present invention is not limited to these methods. The safety vent 121 having a varying depth formed by such methods forms a site where plastic deformation has occurred relatively severely 121a, because of the varying depth. When an electrode assembly (not shown) is placed and sealed in a can 120 having such a safety vent 121, and then the internal pressure in the can 120 increases to exceed a critical value, the site where plastic deformation has occurred severely 121 a, having the greatest depth, opens first. Thus, a desired site is opened first, by varying the depth of the safety vent 121.

Furthermore, the depth of the safety vent 121 may vary with a constant gradient ($121c/121b$=a constant). As the depth of the safety vent 121 varies, the site where plastic deformation has occurred severely is opened first. The opening time for the safety vent 121 to open wide can be varied by configuring the variance in the depth of the safety vent 121 with a constant gradient. That is, when the opening time of a safety vent 121 formed to have a depth with a steep gradient is compared with the opening time of a safety vent 121 formed to have a depth with a gentle gradient, the safety vent 121 formed to have a depth with a steep gradient has a shorter opening time. Therefore, the opening time of the safety vent 121 can be controlled by adjusting the gradient of the variance in the depth of the safety vent 121. In other words, the fracture site of the safety vent 121 may be controlled by adjusting the opening time thereof.

Moreover, referring to FIG. 1D, the safety vent 121 is formed to include a first line 121d which is formed in the same direction as the direction of insertion of the electrode assembly 110 shown in FIG. 1A into the can 120; a second line 121e which is formed in a direction perpendicular to the first line 121d to be separated therefrom; and a third line 121f which is formed in a direction oblique to the first line 121d and the second line 121e to link the first line 121d and the second line 121e. Referring to FIG. 1E, which depicts the shape of the safety vent 121 having such structure when opened, the site where the third line 121f is formed opens first, and then the first line 121d and the second line 121e simultaneously split to open wide. If the depth of the safety vent 121 at the third line 121f is made deeper, the third line 121f opens even earlier, so that the result as illustrated in FIG. 1E can be obtained more definitely. The third line 121f may also be formed as a curve linking the first line 121d and the second line 121e. Furthermore, the first line 121d, the second line 121e, and the third line 121f may also be formed as a curve such that the curvatures thereof change more smoothly, thereby controlling the fracture shape at the time of fracture of the safety vent 121.

In addition, the depth of the safety vent 121 gradually increases along the direction of insertion of the electrode assembly 110 into the can 120. That is, the electrode assembly 110 is slid into the can 120. Referring to FIG. 1C, the safety vent 121 which protrudes toward the interior of the can 120 with a gradually increasing depth, guides the electrode assembly 110, which is inserted in the direction indicated by the arrow in the figure, to slide into the can. Since the depth of the safety vent 121 gradually increases to guide the electrode assembly 110 to slide into the can, when the electrode assembly is inserted into the can 120, the outer surface of the electrode assembly 110 is prevented from being torn off by the inner protruding part of the safety vent 121.

As shown in FIG. 1D, the safety vent 121 may be formed by straight lines intersecting each other to form angles. As shown in FIG. 1F, the safety vent 121 may be formed by straight lines and curves intersecting each other to form flexures. Also, as shown in FIG. 1G, the safety vent 121S2 may be formed by curves intersecting each other to form flexures. As such, when straight lines and curves are selectively used to form angles or flexures, fracture can be made to initiate from the boundary points with angles formed or from flexure sites.

Figure 2:
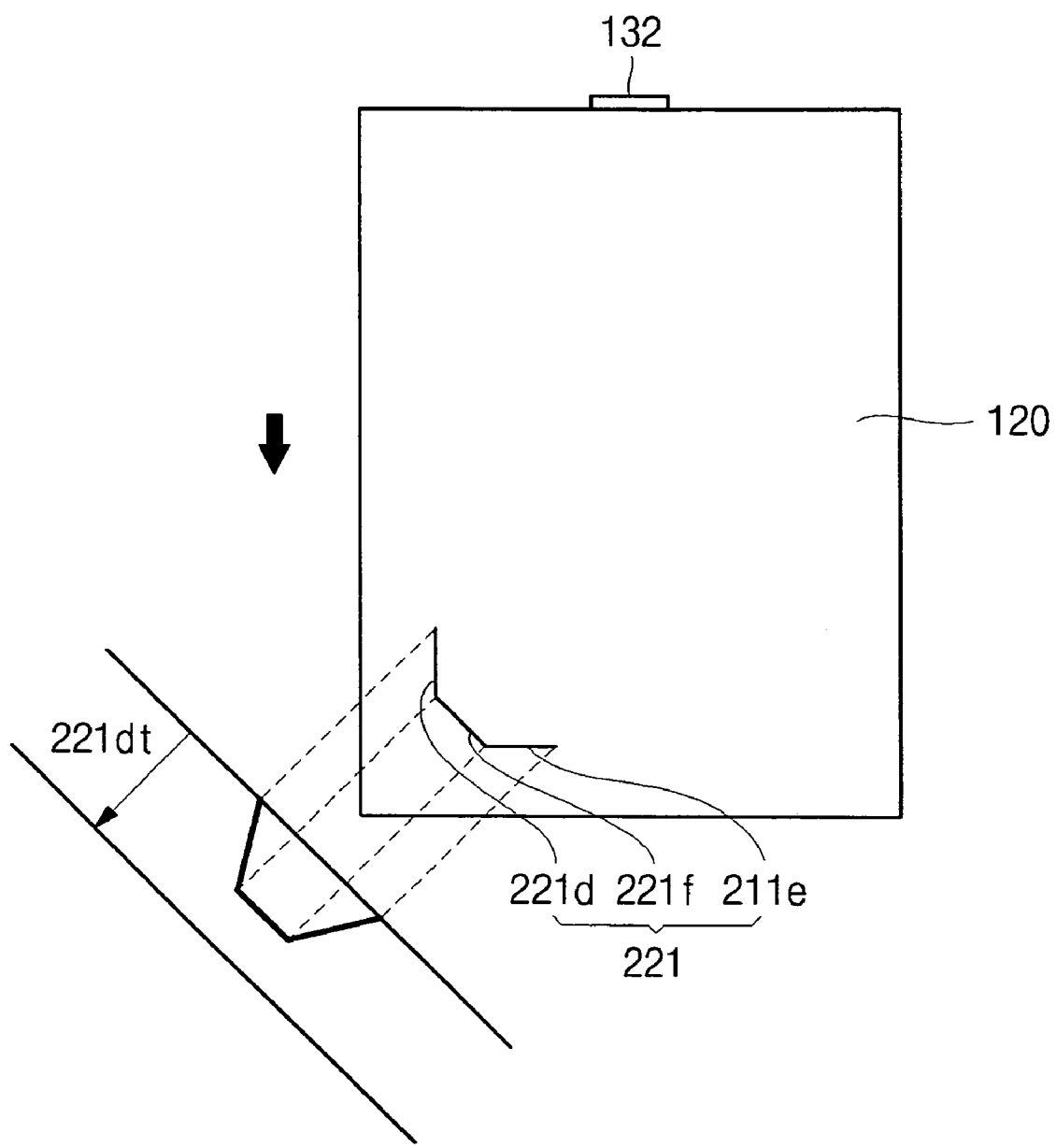
FIG. 2 is a front view of a secondary battery according to another embodiment of the present invention.

FIG. 2 is a front view of a secondary battery according to another embodiment of the present invention.

As shown in FIG. 2, a graph illustrating the relative ratio for a depth 221dt from a first line 221d to a second line 221e is shown. A safety vent 221 can be formed, in order to facilitate fracture, such that a depth 221dt of the first line 221d gradually increases to the point of intersection with a third line 221f; a depth 221dt of the third line 221f is constant from the intersection point between the first line 221d and the third line 221f to the intersection point between the third line 221f and a second line 221e; a depth 221dt of the second line 221e gradually decreases from the point of intersection with the third line 221f. Such a variance is provided to generate a site where fracture occurs first, by subjecting the third line 221f to the most severe plastic deformation.

Figure 3:
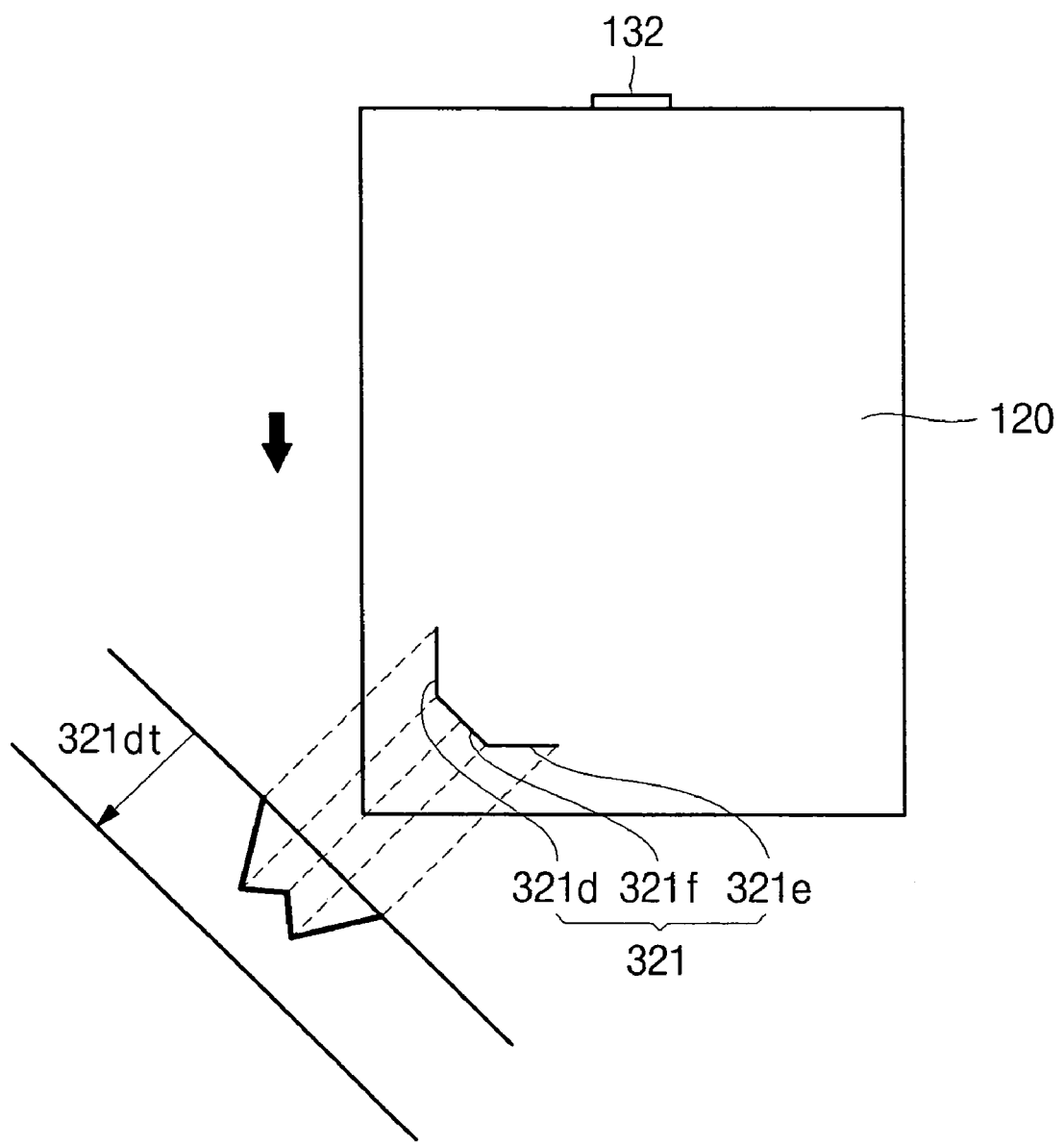
FIG. 3 is a front view of a secondary battery according to another embodiment of the present invention.

FIG. 3 is a front view of a secondary battery according to another embodiment of the present invention.

As shown in FIG. 3, a safety vent 321 can also be formed such that a depth 321dt of a first line 321d gradually increases to the point of intersection with a third line 321f; a depth 321dt of the third line 321f decreases from the intersection point between the first line 321d and the third line 321f to the mid-point of the third line 321f, and the depth 321dt increases again from the mid-point of the third line 321f to the intersection point between the third line 321f and a second line 321e; and a depth 321dt of the second line 321e gradually decreases from the point of intersection with the third line 321f to the end portion of the second line 321e. Thus, fracture can take place first at the two intersection points of one between the first line 321d and the third line 321f and another between the third line 321f and the second line 321e.

Figure 4A:
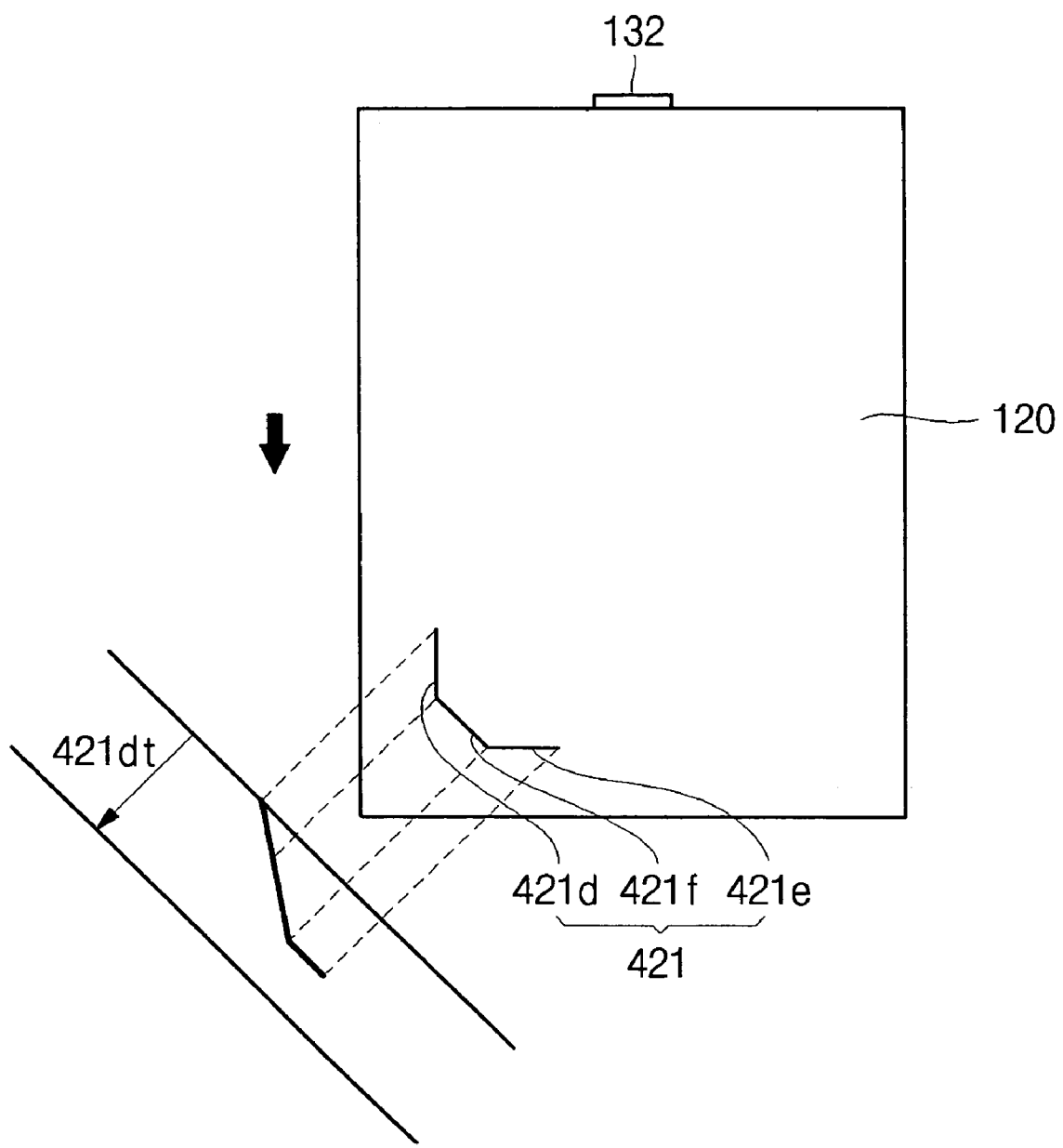
FIG. 4A is a front view of a secondary battery according to another embodiment of the present invention.
Figure 4B:
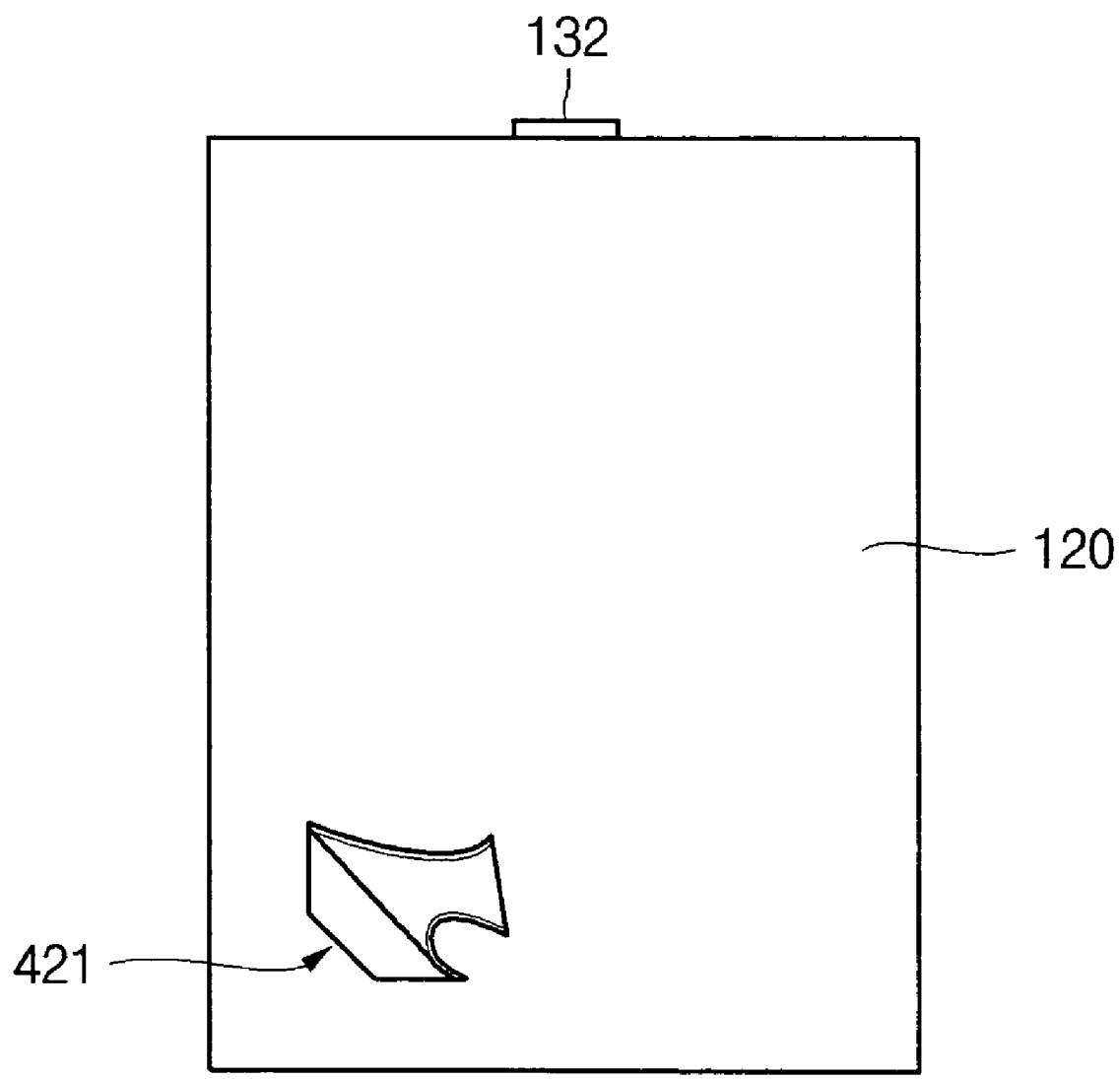
FIG. 4B is a front view of the secondary battery in FIG. 4A, after a safety vent has opened.

FIG. 4A is a front view of a secondary battery according to another embodiment of the present invention. FIG. 4B is a front view of the secondary battery of FIG. 4A, after a safety vent has opened.

As shown in FIG.4A, a safety vent 421 can also be formed such that a depth 421dt from a first line 421d to a third line 421f gradually increases; and the depth 421dt gradually decreases from the intersection point between the third line 421f and a second line 421e to the end portion of the second line 421e. This is intended to form an asymmetric variance in the depth from the first line 421d to the third line 421f. Therefore, when the variance of depth is generated asymmetrically from the first line 421d to the third line 421f, fracture occurs at the intersection point between the third line 421f and the second line 421e, where the depth is greatest, and thus, as shown in FIG. 4B, the safety vent 421 can form the gap in a direction different from that of the gap shown in FIG. 1E.

Figure 5:
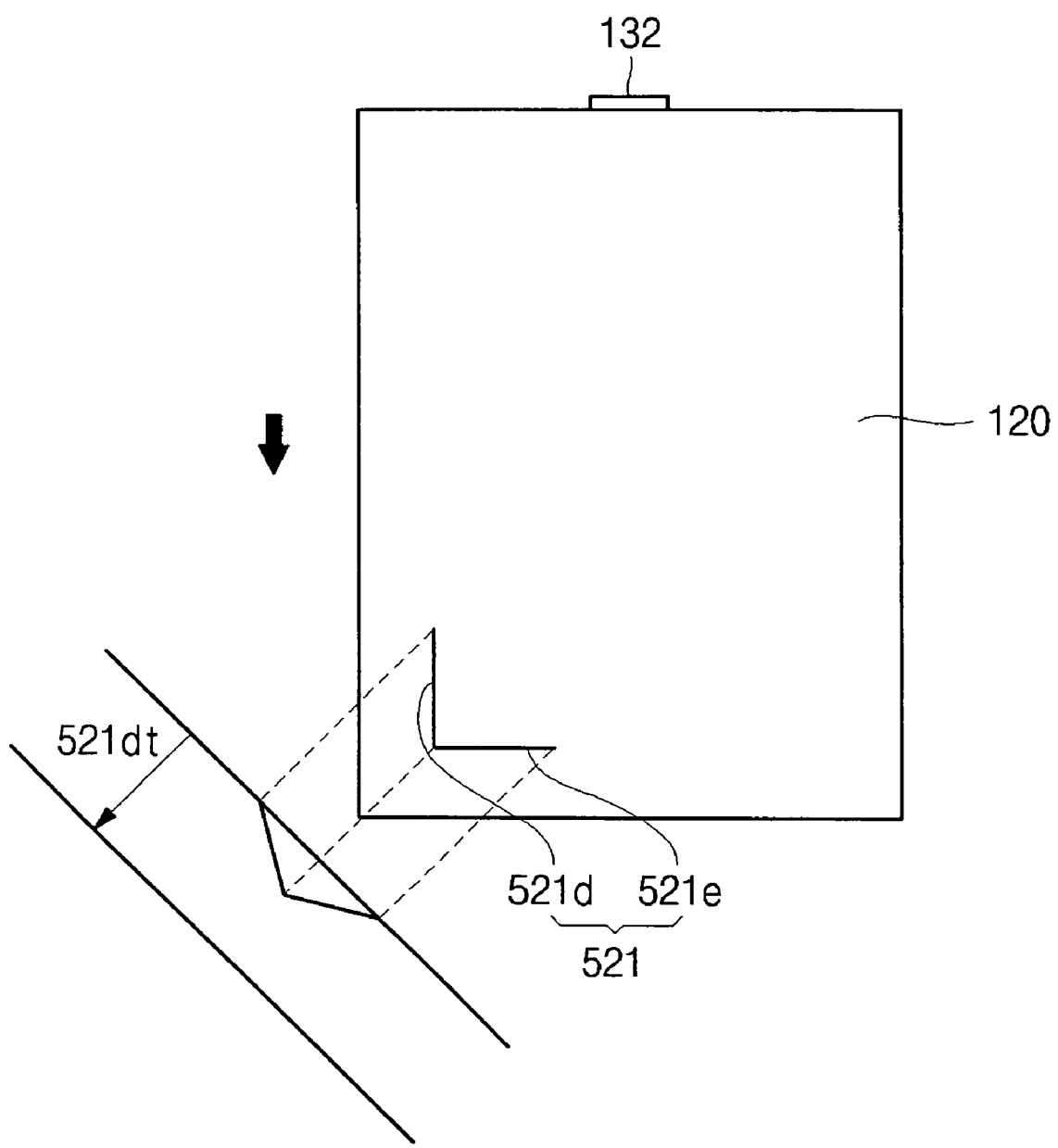
FIG. 5 is a front view of a secondary battery according to another embodiment of the present invention.

FIG. 5 is a front view of a secondary battery according to another embodiment of the present invention.

As shown in FIG. 5, a safety vent 521 can be formed to include a first line 521d which is formed in the same direction as the direction of insertion of the electrode assembly (not shown) into the can 120, and a second line 521e which is formed in a direction perpendicular to the first line 521d to be connected thereto. The first line 521d and the second line 521e can be connected to each other in the vicinity of a corner of the can 120, facing the corner of the can 120.

Furthermore, as shown in FIG. 5, a depth 521dt of the first line 521d may gradually increases to the point of intersection with the second line 521e, and then a depth 521dt of the second line 521e may gradually decreases from the point of intersection with the first line 521d to the end portion of the second line 521e. Thus, the fracture of the safety vent 521 can occur at the intersection point between the first line 521d and the second line 521e.

Figure 6:
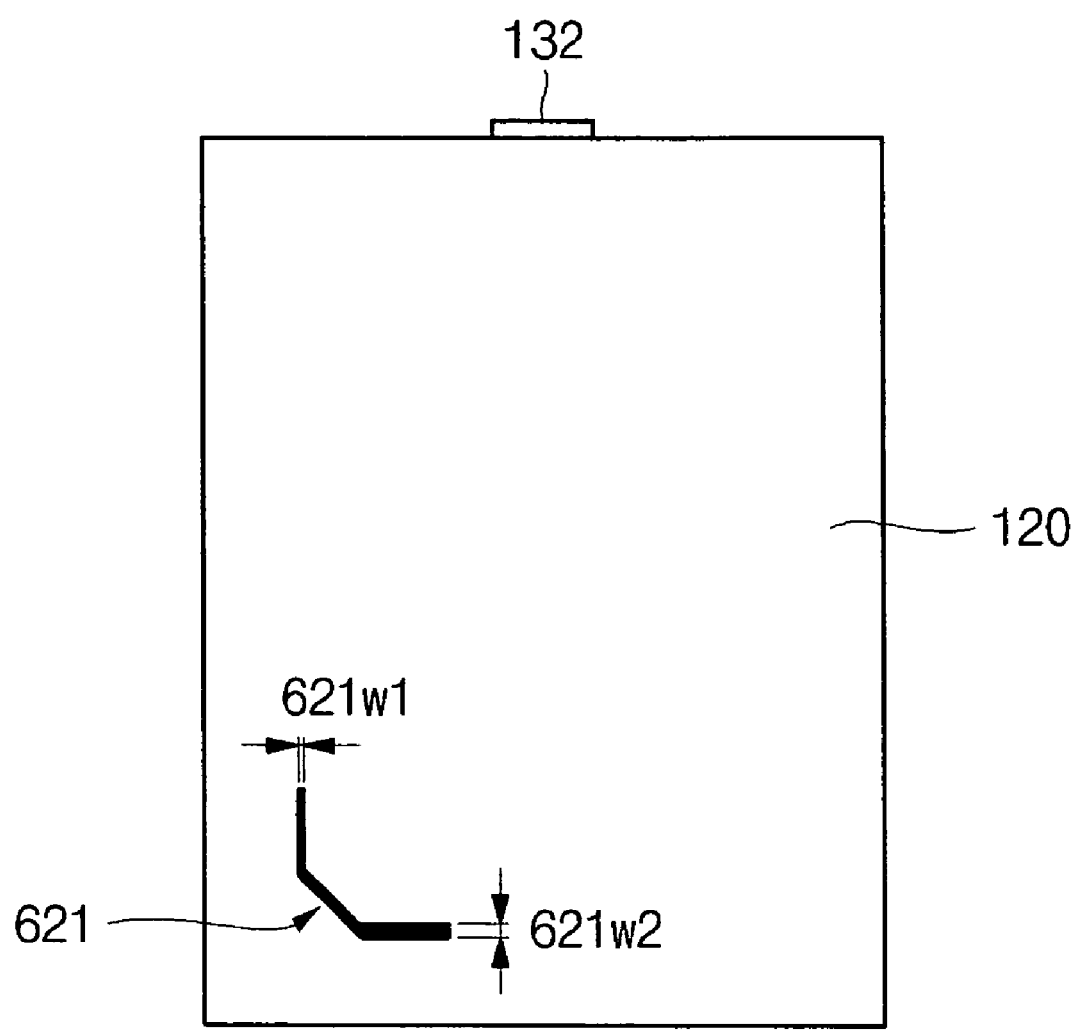
FIG. 6 is a front view of a secondary battery according to another embodiment of the present invention.

FIG. 6 is a front view of a secondary battery according to another embodiment of the present invention.

As shown in FIG. 6, the width of a safety vent 621 may vary along the length direction thereof. FIG. 6 shows a varying width of the safety vent shown in FIG. 1D. Such variance in the width of the safety vent 621 may also be correlated to the opening time of the safety vent 621. That is, when a site of the safety vent 621 with a larger width 621W2 is compared with a site of the safety vent 621 with a smaller width 621W1, the opening time is relatively longer for the site with a larger width 621W2 than for the site with a smaller width 621W1. Accordingly, the present invention may have an effect of controlling the fracture site of the safety vent 621 by adjusting the depth and width of the safety vent 621.

What is claimed is:

1. A secondary battery comprising:
    a can;
    an electrode assembly accommodated within the can; and
    a safety vent arranged on the can accommodating the electrode assembly, the safety vent having a groove and having a varying depth,
    wherein a width of the safety vent increases along a length direction of the safety vent.

2. The secondary battery according to claim 1, wherein the depth of the groove of the safety vent varies with a constant gradient.

3. The secondary battery according to claim 1, wherein the safety vent comprises one of: straight lines intersecting each other to define angles, straight lines and curves intersecting each other to define flexures, or curves intersecting each other to define flexures.

4. The secondary battery according to claim 1, wherein a depth of the safety vent gradually increases along a direction of insertion of the electrode assembly into the can.

5. The secondary battery according to claim 3, wherein the safety vent comprises a first line arranged in a same direction as a direction of insertion of the electrode assembly into the can; a second line arranged in a direction perpendicular to the first line and separated from the first line; and a third line arranged in a direction oblique to both the first line and the second line, the third line connecting the first line to the second line.

6. The secondary battery according to claim 5, wherein a depth of the first line gradually increases to a point of intersection with the third line; a depth of the third line is constant; and a depth of the second line gradually decreases from a point of intersection with the third line.

7. The secondary battery according to claim 5, wherein a depth of the first line gradually increases to a point of intersection with the third line; a depth of the third line gradually decreases from a point of intersection with the first line to a mid-point of the third line, and then gradually decreases from the mid-point of the third line to a point of intersection with the second line; and a depth of the second line gradually decreases from the point of intersection with the third line.

8. The secondary battery according to claim 5, wherein a depth of the safety vent gradually increases from the first line to the third line, and then gradually decreases from the second line.

9. The secondary battery according to claim 3, wherein the safety vent comprises a first line arranged in a same direction as a direction of insertion of the electrode assembly into the can, and a second line arranged in a direction perpendicular to the first line, the second line being connected to the first line.

10. The secondary battery according to claim 9, wherein the first line and the second line are connected to each other in a vicinity of a corner of the can, and facing the corner of the can.

11. The secondary battery according to claim 9, wherein a depth of the first line gradually increases to a point of intersection with the second line, and a depth of the second line gradually decreases from a point of intersection with the first line.

* * * * *